INVENTOR
William R. Edgerton

BY John L. Shortley

ATTORNEY

# United States Patent Office 3,370,416
Patented Feb. 27, 1968

3,370,416
CHAIN LINK PLATES AND METHOD OF MAKING
William R. Edgerton, West Hartford, Conn., assignor to Hewitt-Robins Incorporated, Stamford, Conn.
Filed Dec. 8, 1964, Ser. No. 416,761
6 Claims. (Cl. 59—5)

ABSTRACT OF THE DISCLOSURE

A method of forming chain link plates from blanks having a variable volume of material whereby the desired thickness of the plates immediately adjacent the points of maximum stress, i.e., the openings in the link plates, can be precisely achieved even though the other portions of the plate may be undersized. Further, the grain flow pattern within the plates adjacent the holes is arranged by the process to provide greater strength and durability, and the product thus formed by such process is also covered.

---

The present invention relates to improvements in link plates and particularly to link plates for power transmission chain and conveyor chain of the type pivotally connected to each other. The invention more specifically pertains to improvements in such link plates wherein the grain flow lines of the metal are so disposed about the openings in the link plates as to improve the strength characteristics and also the endurance characteristics of such elements. The invention also pertains to a method of making these link plates.

It is customary to make link plates for use, for example, in transmission and conveyor chains by cutting them from rolled or drawn metal. It is a common practice to blank the link plates from a flat rolled strip or the like. The link plates are often of greater width adjacent their end portions to accommodate the openings for transversely disposed pins or bushings which interconnect the link plates. The metal cut away from the outside contour of the link plates represents waste in addition to the metal which is cut out in developing the openings. Furthermore, since the direction of grain elongation of the rolled metal stock is arranged generally longitudinally of the link plates, the blanking of the outside contour and the piercing of the blank to develop the openings for connecting the link plates results in cutting across the direction of grain elongation. This naturally results in the reduction of static and impact strength characteristics and a tendency toward fatigue failures from cyclical loading when the link plates are used in an operating chain. The variations in thickness of commercially available rolled metal stock is also a contributing factor in link failures. The thickness variations produce link plates of different thicknesses. This results in varying strength characteristics for the links. Thus failures are less predictable and uniformity of life expectancy is more difficult to approach. The purposes of this invention include those of producing chain links of more uniform strength characteristics, links which do not have a tendency toward failure due to cutting across the direction of grain elongation, and also to reduce the waste of material in blanking out links.

It is accordingly an object of the present invention to provide side bars or link plates for power transmission or conveyor chain wherein the metal grain flow lines are disposed about the openings for the pivotal connection of the link plates in a manner to provide improvements in the strength and endurance characteristics of the plates and particularly in the areas immediately surrounding the apertures for the pivot elements which connect the link plates to form a chain.

A further object of the present invention is to provide a method of manufacturing link plates for a pivotal link chain wherein the metal stock is utilized with minimum waste to thereby reduce the cost of manufacturing the link plates and the chains formed thereof.

A still further object of the invention is to provide a method of making link plates wherein variations in the thickness of the link plates is virtually eliminated in the areas immediately surrounding the openings for receiving the transverse elements which pivotally connect the link plates to each other, and to thereby provide more uniform thickness for the link plates in these areas of maximum operating stresses.

Yet another object of the invention is to provide a method of making link plates for a sprocket type chain wherein the grain flow lines of the metal are so arranged during manufacturing so as to conform substantially to the shape of the link plates thereby providing optimum strength characteristics and dynamic properties for the link plates of the chain.

Another object of this invention is to provide a method of forming link plates having uniform thickness, and strength and endurance characteristics at their maximum stress locations yet whereby it is possible to use commercially available stock having normal tolerances.

Other objects and features of the invention will be appreciated and become apparent particularly to those skilled in the art pertaining to transmission conveyor chains of the pivoted link type as the present disclosure proceeds and upon consideration of the accompanying drawing wherein an embodiment of the invention and method steps carrying out the invention are disclosed.

Figure 1:
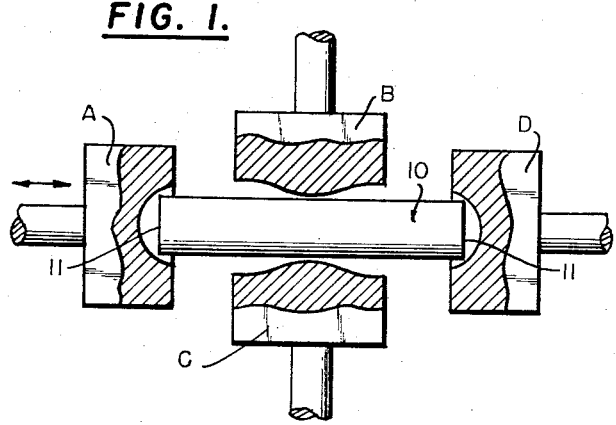
FIGURE 1 is a side elevational view of a rod shaped blank from which the link plates embodying the invention are formed by the method steps of the invention, and showing in fragmentary section apparatus employed according to the method.
Figure 2:
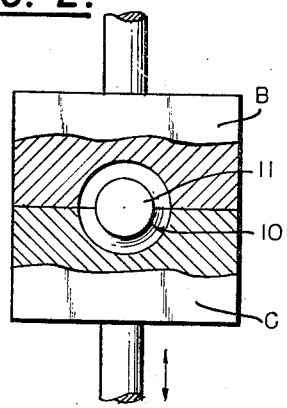
FIGURE 2 is an end elevational view of the blank shown in FIGURE 1.

In carrying out the invention a length of rolled or drawn metal stock of circular cross section forms a blank 10 as shown in FIGURE 1 from which the link plates are formed in accordance with the method.

The blank may be cut by shearing or "cracker cutting" from a length of round rod. It is apparent that this blank may also be received as a preform from a supplier. The end surfaces 11 of the blank 10 are disposed substantially at right angles to the longitudinal axis of the blank.

Figure 7:
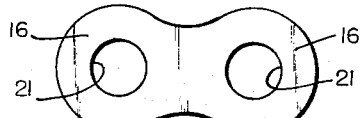
FIGURE 7 is a side elevational view of a link plate after it has been wholly pierced.

A first step after cutting the stock in the manufacture of a link plate for a transmission chain or conveyor chain having a shape as shown in FIGURE 7 involves enlarging the end portions of the blank 10 by upsetting. The blank as shown in FIGURE 1 is upset adjacent both ends to form what might be regarded as a "dumbell" shaped preform shown in FIGURES 3 and 4. This is accomplished by means of the dies A, B, C and D of which A, C and D are movable and B may also be movable if desired. It is obvious that hydraulic rams, guides, etc. and other well known machine elements are utilized in effecting the movement indicated by arrows on the drawing.

Figure 4:
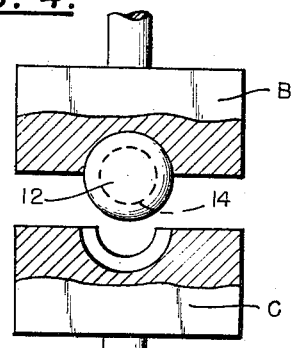
FIGURE 4 is an end elevational view of the preform shown in FIGURE 3 and of a portion of the apparatus illustrated in FIGURE 3.
Figure 5:
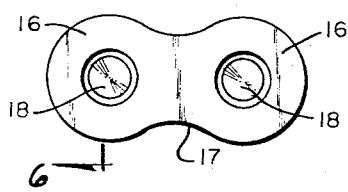
FIGURE 5 is a side elevational view of the preform after it has been flattened and partially pierced.
Figure 6:
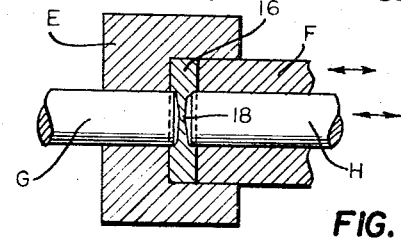
FIGURE 6 is a sectional view taken at the line 6—6 of FIGURE 5, and illustrating in fragmentary section apparatus employed in achieving the form of FIGURES 5 and 6.

The end portions 12 of the resulting preform are somewhat spherically shaped with a waist 14 generally of cylindrical shape connecting the end portions 12. The next step in the method of making the side bar or link plate involves flattening the preform shown in FIGURES 3 and 4. This step is preferably carried out as a combined flattening and partial piercing of the preform. This provides a virtually finished link plate as shown in FIGURES 5 and 6 wherein the flat end portions 16 are connected by flat waist portion 17. The latter, in the illustrated form, has less width than the end portions 16. The opposite faces of the element shown in FIGURES 5 and 6 are substantially parallel and flat as is best shown in FIGURE 6. Partial piercing of the central areas of the end portion 11 leaves relatively thin circular webs 13 crossing the central areas of the end portion 16. This step is accomplished by the die and punch structure E, F, G, and H. Member E is a fixed die member. F is a movable die member and the punches G and H are movable in the die members E and F respectively.

The punches actually form a part of the die. They are preferably withdrawn slightly within the die members E and F in their fully retracted positions. The blanks are inserted with the punches in this position. The die, including the punches, then closes, flattening and fixing the link plate for the succeeding punching operation. Next the punches move inwardly after the die has fully closed. The punches thus cooperate in the flattening but by being initially withdrawn full thickness of the blank at the "center" is promoted. This also results in a full density at the point where the holes will be punched, and the movement of the punches after the die is closed inwardly to complete an initial piercing of the link plate results in a maximum cold working around the partially pierced holes.

Figure 8:
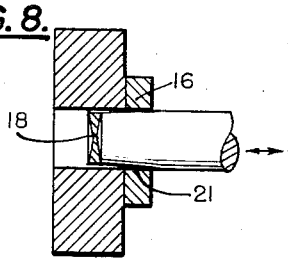
FIGURE 8 is a transverse sectional view taken on the line 8—8 of FIGURE 7 and in section also illustrates the apparatus for completing the piercing.

A final step in the formation of the link plates involves cutting out the webs 18 by shearing or the like to provide openings 21 in the central areas in each end portion 16. This is accomplished by punch structures I and J. The surfaces of the openings may be refined by a burnishing or sizing operation if desired to provide a link plate as shown in FIGURES 7 and 8. Depending upon the nature of the materials utilized, the link plates are ready either for assembly into chain or for metallurgical heat or other treatment known in the art prior to assembly into chain.

Figure 9:
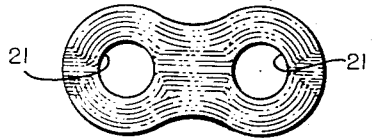
FIGURE 9 is a diagrammatic view showing the grain flow lines or "fiber pattern" of the metal in a finished link plate formed in accordance with the method steps of the invention.

The method steps hereinabove described in working the metal blank from a shape shown in FIGURE 1 into a link plate serves to arrange the grain structure of the metal so that the grain flow lines are in a pattern approximating the phantom lines shown in FIGURE 9. The grain flow adjacent the pin receiving openings in the plate conforms generally to the shape or periphery of these openings. Thus in the illustrated form of FIGURE 9 the grain flow is developed to be of arcuate shape laterally of the openings 21 where the maximum load is imposed on the link plate in use. The method thereby provides for a grain flow line pattern in the metal to substantially conform to the "figure eight" contour of the link plate of FIGURE 7. This provides optimum strength characteristics and dynamic properties for the link plates.

Figure 3:
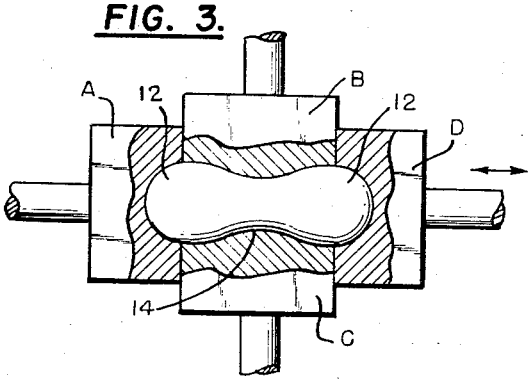
FIGURE 3 is a side elevational view of a preform created at an intermediate stage in the manufacture of a link plate, and showing in fragmentary section the apparatus shown in Frame 1 in a different position.
Figures 10, 11:
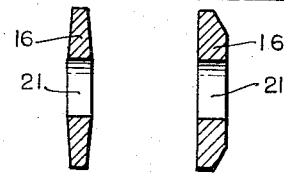
FIGURE 10 is a view similar to FIGURE 8 showing how variations in volume of metal in the original rod shaped blank can be readily tolerated.
FIGURE 11 is a figure similar to FIGURE 8 also, like FIGURE 10, showing how the edges of the link plates may vary without disturbing the vital areas immediately surrounding the openings in the link plates.

Apparatus for carrying out the method and for the step of partial piercing and flattening the preform shown in FIGURE 3 should be such that a maximum link plate thickness is developed immediately around the holes 21. Therefore any variation in the volume of the blank 10 below the maximum volume manifests itself in thickness variations near the perimeter of the finished link plate. The maximum operational stresses, however, are located in the area immediately surrounding the openings 21. The method accordingly provides that all of the link plates, regardless of tolerance variations in the diameter of the original bar stock from which they are formed, would still have a uniform thickness in the final area surrounding the openings 21—the area of maximum stress. Under-size rods will thus form a link plate having shapes as shown in FIGURES 10 or 11 wherein the perimeter has less thickness than the longitudinal central area but the strength characteristics of this link plate in the areas surrounding the openings 21 will not be impaired.

This is, as stated above, accomplished by the apparatus of FIGURE 6. The members E and F close first and then the partial punches G and H operate. Shortage of metal will thus show up at the outer edges of the links and not in the center. The method thus provides control over the thickness throughout the hole areas. This, together with improved disposition of the grain pattern around the pin receiving openings results in greater strength and greater ability to withstand the dynamic forces developed in the use of the chain.

The method herein disclosed also reduces waste. All the stock except that sheared out of the partially pierced apertures is used in forming the link plates.

While the invention has been described with reference to method steps for manufacturing a side bar having a substantially figure eight shape such as employed in precision roller chains it will be appreciated that the method is applicable to the manufacture of other shapes of side bars. Further it will be understood that these and other modifications and alterations may be made in the method and in the finished article without departing from the spirit and the scope of the invention as set forth in the appended claims.

I claim:

1. A link plate having substantially parallel side faces and formed of a blank having a longitudinal grain flow pattern, substantially equal and opposite end portions enlarged transversely of the side faces of said plate by upsetting the opposite ends of said blank, an opening extending transversely of the flat sides of said plate centrally of each of said upset portions, the grain flow pattern of said plate extending generally parallel to the length of said plate but conforming to the peripheries of said openings in the areas adjacent said openings, the thickness of said plate immediately adjacent said openings being precisely controlled.

2. A method of manufacturing a link plate which comprises, upsetting the end portions of a metal rod to provide a preform having substantially spherically shaped end portions connected by a substantially cylindrically shaped waist, flattening the preform to provide substantially flat side faces along said end portions and forming openings in each end portion with the metallic grain flow pattern of the metal adjacent said openings conforming generally to the shape of said openings.

3. A method of manufacturing a link plate which comprises, upsetting the end portions of an elongated metal blank to provide a preform having generally spherical shaped end portions connected by a substantially cylindrical shaped waist, flattening the end portions and the waist to provide substantially parallel side faces, forming openings in the flattened end portions to provide a link plate wherein the metallic grain flow pattern of the metal adjacent said openings conforms generally to the shape of said openings.

4. A method of manufacturing a link plate for a chain which comprises, upsetting the end portions of a metal rod having a circular cross section to provide a member having substantially spherically shaped end portions connected by a cylindrically shaped waist, flattening said member and partially piercing said end portions of said member to provide substantially flat side faces and partially formed openings in said end portions and piercing the member to form openings in each end portion to provide a link plate wherein the metallic grain flow pattern of the metal extends generally longitudinally of the plate and arcuately about said openings.

5. A method of manufacturing a link plate for a chain which comprises, upsetting the end portions of an elongated metal blank having a circular cross section to provide a preform having generally spherically shaped end portions connected by a substantially cylindrically shaped waist, flattening and partially piercing the end portions and the waist to provide substantially parallel side faces with the end portions having greater widths than the flattened waist, and forming openings in the flattened end portions to provide a link plate wherein the metallic grain flow pattern of the metal surrounding said opening conforms generally to the perimeters of said openings.

6. A method of forming link plates, having spaced openings for receiving connecting members, from blanks having variations in volume wherein a desired thickness of the plates immediately adjacent said openings will be achieved despite said variations in volume, consisting of upsetting opposite ends of said blanks to produce enlarged portions at said ends in which the openings will be provided, which portions are thicker than the desired finished thickness adjacent the openings to be formed and at the same time by said upsetting process conforming the grain flow pattern of the blank at said thickened portions generally to the shape of the openings to be provided, reducing said enlarged portions transversely of said plates so as to provide sections having a controlled thickness centrally of said portions and forming the openings centrally of the latter controlled thickness sections.

References Cited
UNITED STATES PATENTS 669,108   3/1901   Wood _____ 59—5

FOREIGN PATENTS 987,807   4/1951   France.
993,006   7/1951   France.

CHARLES W. LANHAM, *Primary Examiner.*

G. P. CROSBY, *Assistant Examiner.*